United States Patent
Hiraoka

(10) Patent No.: US 8,342,438 B2
(45) Date of Patent: Jan. 1, 2013

(54) SPINNING REEL SPOOL SUPPORT STRUCTURE

(75) Inventor: Hirokazu Hiraoka, Osaka (JP)

(73) Assignee: Shimano Inc., Osaka (JP)

(*) Notice: Subject to any disclaimer, the term of this patent is extended or adjusted under 35 U.S.C. 154(b) by 291 days.

(21) Appl. No.: 12/952,998

(22) Filed: Nov. 23, 2010

(65) Prior Publication Data

US 2011/0180646 A1    Jul. 28, 2011

(30) Foreign Application Priority Data

Jan. 22, 2010   (JP) ................... 2010-011823

(51) Int. Cl.
*A01K 89/01* (2006.01)
(52) U.S. Cl. ............ 242/321; 242/246; 242/311
(58) Field of Classification Search .......... 242/246, 242/310, 311, 321
See application file for complete search history.

(56) References Cited

U.S. PATENT DOCUMENTS

| | | | | |
|---|---|---|---|---|
| 4,951,897 A * | 8/1990 | Takeuchi | | 242/246 |
| 5,358,196 A * | 10/1994 | Kawabe | | 242/246 |
| 5,988,547 A * | 11/1999 | Koelewyn | | 242/246 |
| 6,286,772 B1 * | 9/2001 | Koelewyn | | 242/246 |
| 6,607,154 B2 * | 8/2003 | Hitomi | | 242/322 |
| 6,786,442 B2 * | 9/2004 | Sugawara | | 242/231 |
| 6,978,957 B2 * | 12/2005 | Sugawara | | 242/322 |
| 7,314,192 B2 * | 1/2008 | Kitajima et al. | | 242/321 |
| 7,614,576 B2 * | 11/2009 | Ochiai et al. | | 242/246 |
| 2002/0096587 A1 * | 7/2002 | Ikuta | | 242/319 |
| 2002/0125358 A1 * | 9/2002 | Takikura | | 242/319 |
| 2002/0170997 A1 * | 11/2002 | Furomoto | | 242/246 |
| 2004/0251363 A1 | 12/2004 | Sugawara | | |
| 2008/0041999 A1 | 2/2008 | Nilsen | | |
| 2008/0290202 A1 * | 11/2008 | Ochiai et al. | | 242/246 |

FOREIGN PATENT DOCUMENTS

| | | |
|---|---|---|
| EP | 1 425 965 A1 | 6/2004 |
| JP | H03-58965 U | 6/1991 |
| JP | 2002-204640 A | 7/2002 |
| JP | 2005-000103 A | 1/2005 |

* cited by examiner

Primary Examiner — Emmanuel M Marcelo
(74) Attorney, Agent, or Firm — Global IP Counselors, LLP

(57) ABSTRACT

A retainer member has a retainer portion, a through hole, and non-circular cross section. A bearing section is disposed on an outer periphery of the retainer portion. The through hole has a circular axial cross section and an inner periphery, which is axially penetrated by a non-circular portion of a spool shaft from back to front. The non-circular cross-sectional portion is formed by cutting out a front end of the retainer portion by machining. The non-circular cross-sectional portion has a non-circular axial cross section that engages the non-circular portion of the spool shaft.

20 Claims, 14 Drawing Sheets

SPINNING REEL SPOOL SUPPORT STRUCTURE

CROSS-REFERENCE TO RELATED APPLICATIONS

This application claims priority to Japanese Patent Application No. 2010-011823 filed on Jan. 22, 2010, the entirety of which is hereby incorporated by reference.

BACKGROUND

Field of the Invention

The present invention relates to a spool support structure, particularly to a spinning reel spool support structure for attaching a spool onto a spool shaft in a rotatable state.

BACKGROUND ART

Conventional spinning reels include a reel unit, a rotor, and a spool. The reel unit supports a handle while allowing it to rotate. The spool is attached to a spool shaft in a rotatable state. The spinning reel spool is configured to move back and forth with respect to the reel unit. The spinning reel spool includes a bobbin trunk and a skirt. The bobbin trunk allows a fishing line to be wound around the outer periphery thereof. Further, the bobbin trunk allows a spool shaft to be attached to the inner periphery thereof. The skirt is a large-diameter tubular portion disposed on the rear end of the bobbin trunk. An annular member is disposed on the rear end of the bobbin trunk. Simultaneously, the annular member is attached onto the spool shaft while being prevented from moving. The annular member prevents the spool from moving rearward. The annular member includes a roughly-oval, i.e., non-circular, through hole in the radial inner part of the annular member. The non-circular through hole is attached onto the spool-shaft front end portion having a non-circular cross section while being prevented from rotating. In the cases of the front drag spinning reels, the bobbin trunk contains components such as a drag mechanism having a plurality of drag plates.

For example, Japan Laid-open Patent Application Publication No. JP-A-2002-204640 describes a spool of the aforementioned type attached onto a spool shaft through a bearing, e.g., a ball bearing, in a rotatable state. A bearing of this type is disposed in the inner periphery of the bobbin trunk. Simultaneously, the bearing is attached onto the outer periphery of the spool shaft while being prevented from rotating. Further, the inner periphery of the bearing is retained by a tubular retainer member having a circular hole. The retainer member abuts the annular member with the rear end thereof while being pressed rearward by the bobbin trunk. Further, the retainer member includes a through hole intersecting the spool shaft. On the other hand, the spool shaft includes a female threaded portion communicating with the through hole of the retainer member. A pin member, e.g., a hexagonal socket locking screw, is screwed into and penetrates through the through hole of the retainer member and the female threaded portion of the spool shaft. The retainer member is thereby fixed to the spool shaft while being prevented from rotating. The retainer member herein abuts the annular member with the rear end thereof for preventing the spool from moving rearward. Therefore, the drag plates can be pressed rearward by activating the drag mechanism.

In some cases, an angler loosens the drag mechanism of the spinning reel of this type to employ tactics for catching fish and the like in actual fishing. When the drag mechanism is loosened, the drag plates, having pressed rearward, reduce backward pressure. When the pressure of the drag plates is reduced, the bobbin trunk reduces pressure for pressing the retainer member rearward. Accordingly, wobble may occur between the retainer member and the spool. This is because the spool shaft, having a non-circular cross section, penetrates the circular hole of the retainer member and the structure produces a pair of roughly arched clearances between the retainer member and the spool shaft. Wobble in the retainer member may block smooth back-and-forth movement of the spool.

To solve the aforementioned drawback, Japan Laid-open Patent Application Publication No. JP-A-2005-000103 describes a spinning reel with a wobble prevention member attached to clearances between a circular portion of a retainer member and a non-circular portion of a spool shaft. The wobble prevention member herein has a cross section matched with the shape of the clearances. According to the spinning reel, clearances can be reduced between the circular portion of the retainer member and the non-circular portion of the spool shaft with the structure that the wobble prevention member, having the cross section matched with the cross-sectional shape of the clearances, is attached to the clearances. Therefore, wobble of the retainer member can be prevented.

According to the aforementioned spinning reel of the well-known type, clearances can be reduced between the circular portion of the retainer member and the non-circular portion of the spool shaft with the structure that the wobble prevention member, having a cross section matched with the cross-sectional shapes of the clearances, is attached to the clearances. In this case, however, the wobble prevention member is an individual component separate from the retainer member.

Therefore, the number of components is increased in the entire spool. Simultaneously, a large number of steps is required for assembling the spool. As a result, manufacturing cost of the spool may be increased. Further, very small clearances are produced between the circular portion of the retainer member and the non-circular portion of the spool shaft. Therefore, a very thin wobble prevention member is desirable for fitting into the small clearances. In other words, it is difficult to form the wobble prevention member suitable for the above conditions.

In view of the above, it will be apparent to those skilled in the art from this disclosure that there exists a need for an improved spinning reel with a spinning reel spool support structure to prevent easily and reliably wobble of a retainer member in a spinning reel spool. This invention addresses this need in the art as well as other needs, which will become apparent to those skilled in the art from this disclosure.

SUMMARY

A spinning reel spool support structure according to a first aspect is movably attached to a reel unit to move in a back-and-forth direction to allow a spool to be rotatably attached onto a spool shaft having a non-circular portion with a non-circular axial cross section at least in a front end portion thereof. The spinning reel spool support structure includes a bearing section, a retainer member, and a fixation member. The bearing section is disposed on an inner periphery of the spool while supporting the spool to allow the spool to rotate. The retainer member includes a retainer portion, a through hole, and a non-circular cross-sectional portion. The retainer portion allows the bearing section to be disposed on an outer periphery thereof. The through hole has a circular axial cross section, and allows the non-circular portion of the spool shaft to penetrate axially through an inner periphery of the circular portion from back to front. The non-circular cross-sectional portion is formed by cutting out a front end of the retainer portion by machining. The non-circular cross-sectional portion has a non-circular axial cross section to allow the non-circular portion of the spool shaft to be engaged therewith. The fixation member fixes the retainer member to the spool shaft to prevent the retainer member from axially moving.

According to the spinning reel spool support structure of the first aspect, the retainer member is formed by cutting out the front end of the retainer portion by machining. The retainer member includes the non-circular cross-sectional portion having a non-circular axial cross section to allow the non-circular portion of the spool shaft to be engaged therewith. The non-circular cross-sectional portion of the retainer member is herein engaged with the non-circular portion of the spool shaft. The inner periphery of the retainer member and the non-circular portion of the spool shaft can be fitted without any clearance. The structure prevents wobble of the retainer member. Further, the non-circular cross-sectional portion is formed by cutting out the front end of the retainer portion by machining. Therefore, the inner diameter (or the outer diameter) of the retainer portion can be shared as the common processing reference for the outer diameter (or the inner diameter) of the retainer member and the non-circular cross-sectional portion. The non-circular cross-sectional portion can be thereby easily formed with high accuracy. Consequently, wobble of the retainer member can be prevented easily and reliably.

Further, it may be assumed that the non-circular cross-sectional portion is formed by press work or injection molding. However, the following drawbacks occur when press work or injection molding is used. Simply put, a round/chamfered edge is produced by punching the retainer member in press work, whereas a tapered edge is produced by removing the retainer member from a die/dies in injection molding. Therefore, a pair of surfaces of the non-circular cross-sectional portion, engaged with the non-circular portion of the spool shaft, may be slanted without being parallel to each other. According to the structure disclosed herein, in contrast, the non-circular cross-sectional portion is cut out by machining. Therefore, the engaged surface of the non-circular cross-sectional portion with the non-circular portion of the spools shaft can be formed with high accuracy without producing the aforementioned drawbacks related to press work and injection molding. Thus, wobble of the retainer member can be further reliably prevented with the non-circular cross section formed with high accuracy A spinning reel spool support structure according to a second aspect relates to the spinning reel spool support structure according to the first aspect, wherein the non-circular cross-sectional portion has a cut-out shape radially penetrating the front end of the retainer portion. According to the spinning reel spool support structure of the second aspect, the non-circular cross-sectional portion can be processed without greatly limiting the size of a machining tool. Simultaneously, the other portion of the spool shaft, excluding the non-circular portion, is prevented from easily interfering with the other portion of the non-circular cross-sectional portion, excluding the non-circular cross section, only by processing the non-circular cross section of the non-circular cross-sectional portion with high accuracy.

A spinning reel spool support structure according to a third aspect relates to the spinning reel spool support structure according to one of the first and second aspects, wherein the non-circular cross-sectional portion is formed by milling. According to the spinning reel spool support structure of the third aspect, the non-circular cross-sectional portion can be easily formed with high accuracy, especially when the non-circular cross-sectional portion includes a pair of parallel-opposed surfaces.

A spinning reel spool support structure according to a fourth aspect relates to the spinning reel spool support structure according to one of the first to third aspects, wherein the non-circular cross-sectional portion has a cut-out shape including a pair of parallel-opposed surfaces. According to the spinning reel spool support structure of the fourth aspect, wobble of the retainer member can be prevented easily and reliably by forming the non-circular portion of the spool shaft in a roughly oval shape including a pair of parallel surfaces and by engaging the parallel surfaces of the spool-shaft non-circular portion with the parallel-opposed surfaces of the non-circular cross-sectional portion.

A spinning reel spool support structure according to a fifth aspect relates to the spinning reel spool support structure according to one of the first to fourth aspects, wherein the bearing section includes a first bearing and a second bearing disposed rearward of the first bearing. Further, the retainer portion includes a first retainer portion and a second retainer portion. The first retainer portion has the non-circular cross-sectional portion on a front end thereof. The first retainer portion allows the first bearing to be disposed on an outer periphery thereof. The second retainer portion is disposed rearward of the first retainer portion. The second retainer portion allows the second bearing to be disposed on an outer periphery thereof. According to the spinning reel spool support structure of the fifth aspect, the spool can be stably supported by two bearings, i.e., the first and second bearings.

A spinning reel spool support structure according to a sixth aspect relates to the spinning reel spool support structure according to the fifth aspect, wherein the spinning reel spool support structure further includes a disc portion disposed between the first retainer portion and the second retainer portion. The disc portion includes an outer periphery having a diameter greater than the diameters of the first and second retainer portions. According to the spinning reel spool support structure of the sixth aspect, the first bearing and drag plates are allowed to be disposed forward of the disc plate, whereas the second bearing is allowed to be disposed rearward of the disc portion.

A spinning reel spool support structure according to a seventh aspect relates to the spinning reel spool support structure according to one of the fifth and sixth aspects, wherein the first retainer portion further includes a through hole allowing the fixation member to penetrate therethrough. According to the spinning reel spool support structure of the seventh aspect, the non-circular cross-sectional portion and the through hole are formed in the first retainer portion. Therefore, the through hole can be further easily formed relative to a structure in which the non-circular cross-sectional portion is formed in the first retainer portion and the through hole is formed in the second retainer portion.

Overall, according to the structure disclosed herein, the retainer member is formed by cutting out the front end of the retainer portion in the spinning reel spool by machining. Further, the retainer member includes the non-circular cross-sectional portion having the non-circular axial cross section to allow the non-circular portion of the spool shaft to be engaged therewith. Therefore, wobble of the retainer member can be prevented easily and reliably.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE EXEMPLARARY EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
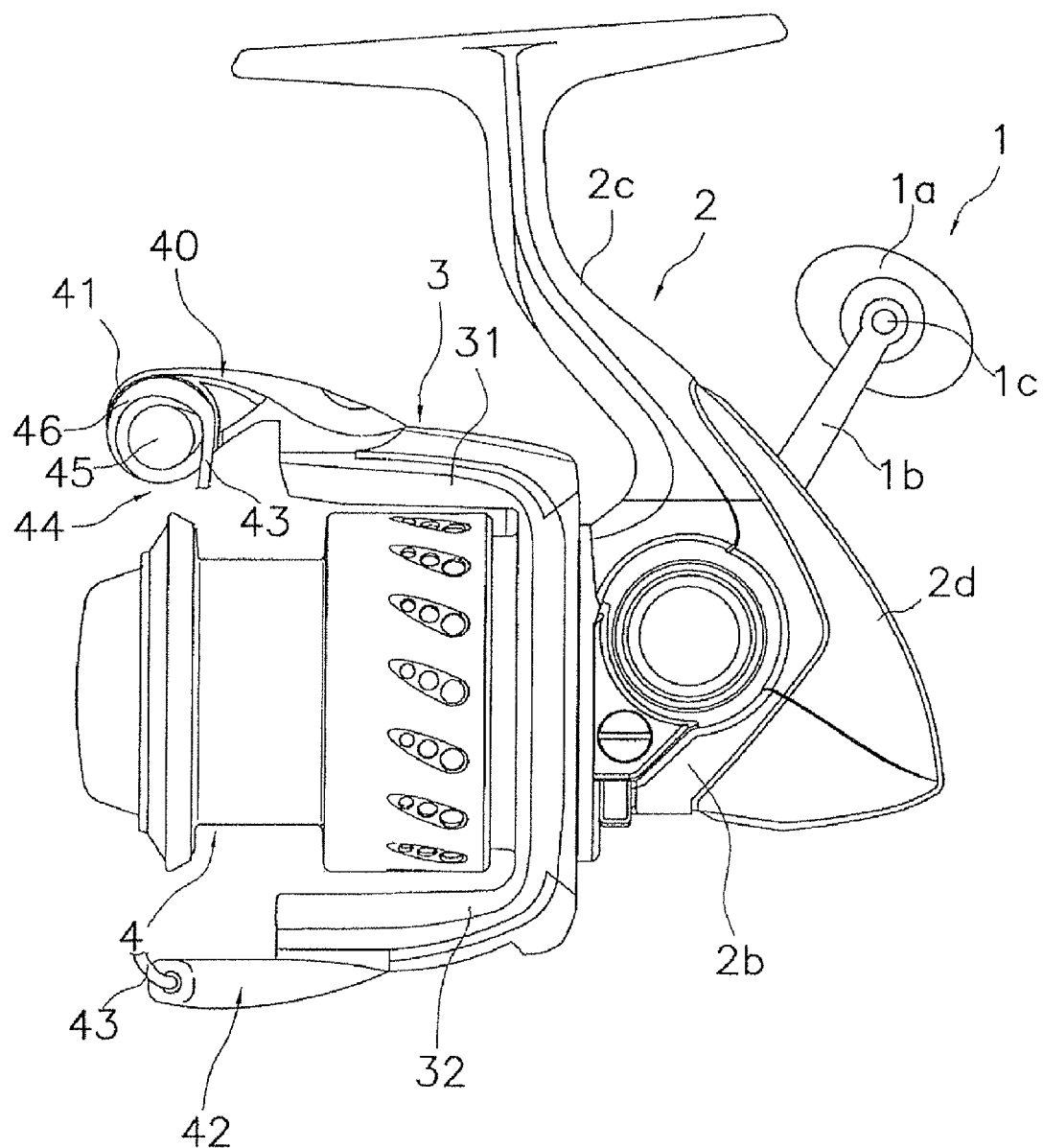
FIG. 1 is a side view of a spinning reel according to an exemplary embodiment.

As illustrated in FIG. 1, a spinning reel, according to an exemplary embodiment, includes a handle 1, a reel unit 2, a rotor 3, and a spool 4. The reel unit 2 supports the handle 1 to allow the handle l to rotate. The rotor 3 is rotatably supported at the front of the reel unit 2. The spool 4 is configured to wind a fishing line onto the outer peripheral surface thereof. The spool 4 is disposed at the front of the rotor 3 while being allowed to move back and forth. The handle 1 is attachable to either the right side or the left side of the reel unit 2.

Figure 2:
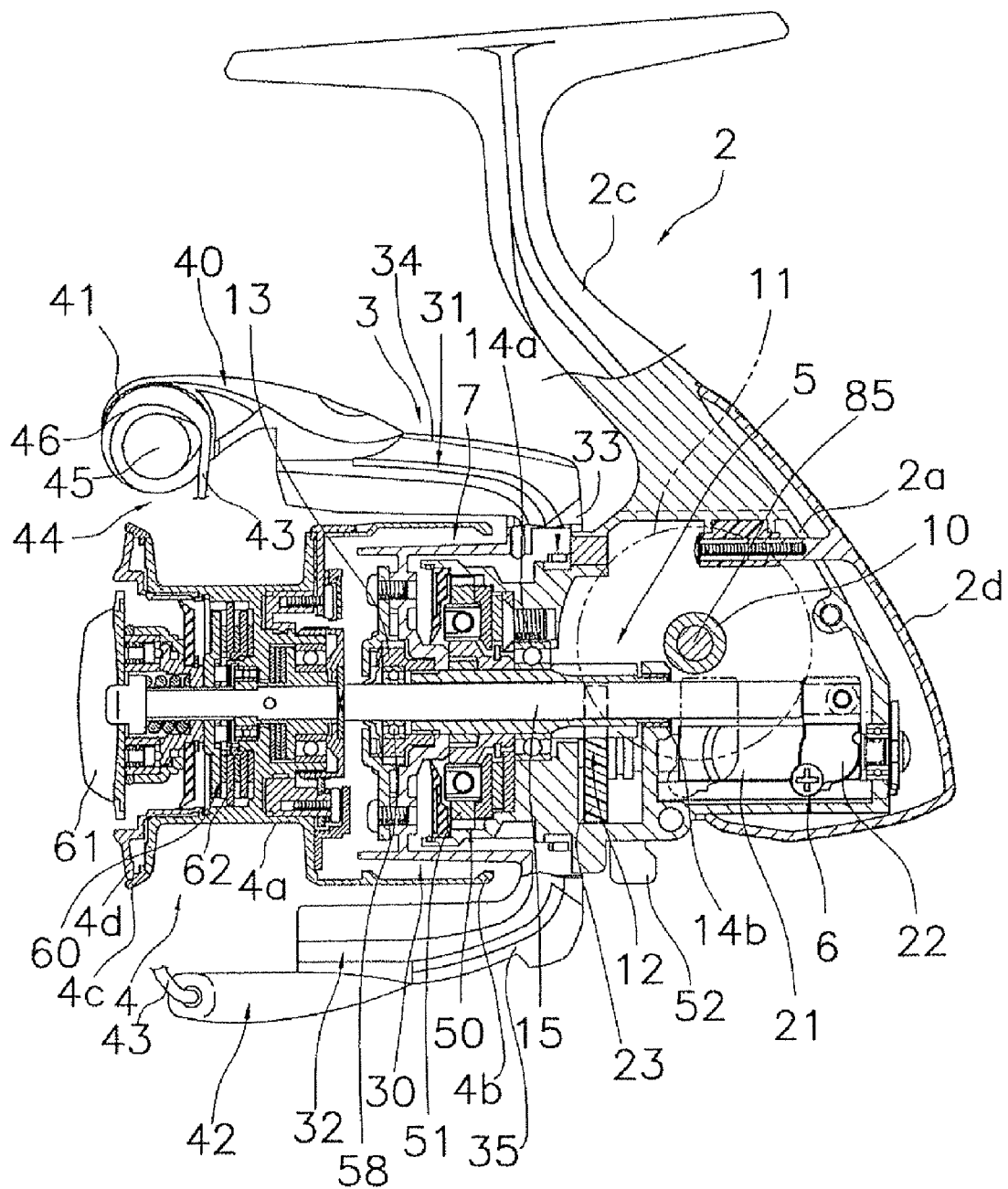
FIG. 2 is a cross-sectional side view of the spinning reel.
Figure 10:
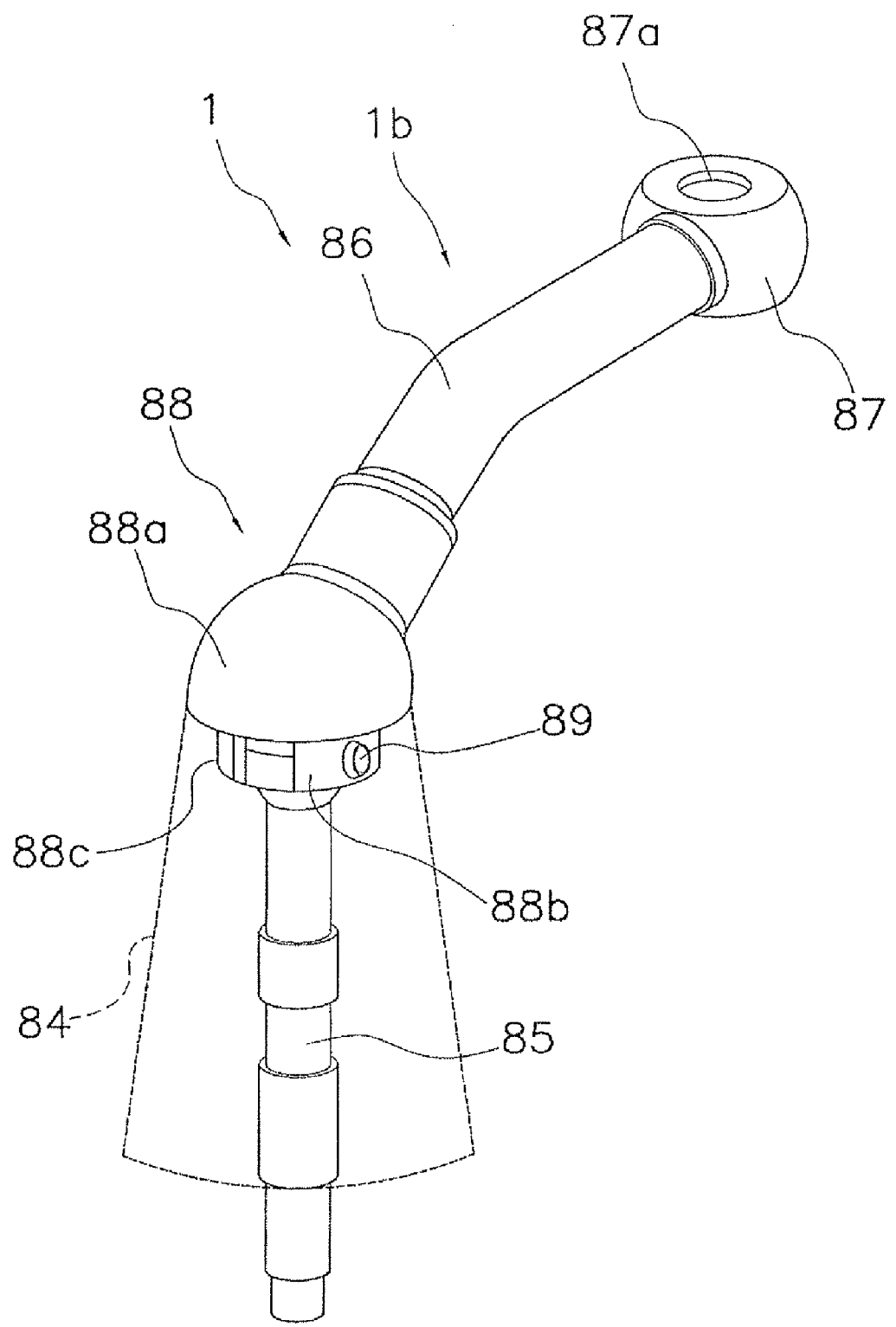
FIG. 10 is a perspective view of a handle of the spinning reel.

As illustrated in FIGS. 1 and 2, the handle 1 includes a handle arm 1b, a knob shaft 1c and a handle knob 1a. The handle arm 1b (see FIG. 1) is attached onto a distal end a handle shaft 85 (see FIG. 2) while being prevented from rotating relative to the handle shaft 85. In other words, the handle arm 1b and handle shaft 85 are integrally rotatable. The knob shaft 1c (see FIG. 1) is a stick-shaped member fixed onto a front end of the handle arm 1b. The handle knob 1a (see FIG. 1) is attached onto the knob shaft 1c while being allowed to rotate and prevented from axially moving relative to the knob shaft 1c. As illustrated in FIG. 10, the handle arm 1b is a stick-shaped member produced by machining of aluminum alloy. The handle arm 1b includes an arm portion 86, a first attachment portion 87, and a second attachment portion 88. The arm portion 86 is a stick-shaped portion extending from the distal end of the handle shaft 85 in a radial outward direction of the handle shaft 85. The arm portion 86 can be hollow. The first attachment portion 87 is a plate-shaped portion formed on the front end of the arm portion 86 for attaching the knob shaft 1c thereto (see FIG. 1). The second attachment portion 88 is a hemispheric portion formed on the base end of the arm portion 86 for attaching the distal end of the handle shaft 85 thereto. The arm portion 86 is a crank arm and the distal end thereof bends towards the reel unit 2. The first attachment portion 87 includes a through hole 87a. The stick-shaped knob shaft 1c (see FIG. 1) is inserted through and fixed into the through hole 87a while being allowed to rotate.

Figure 11:
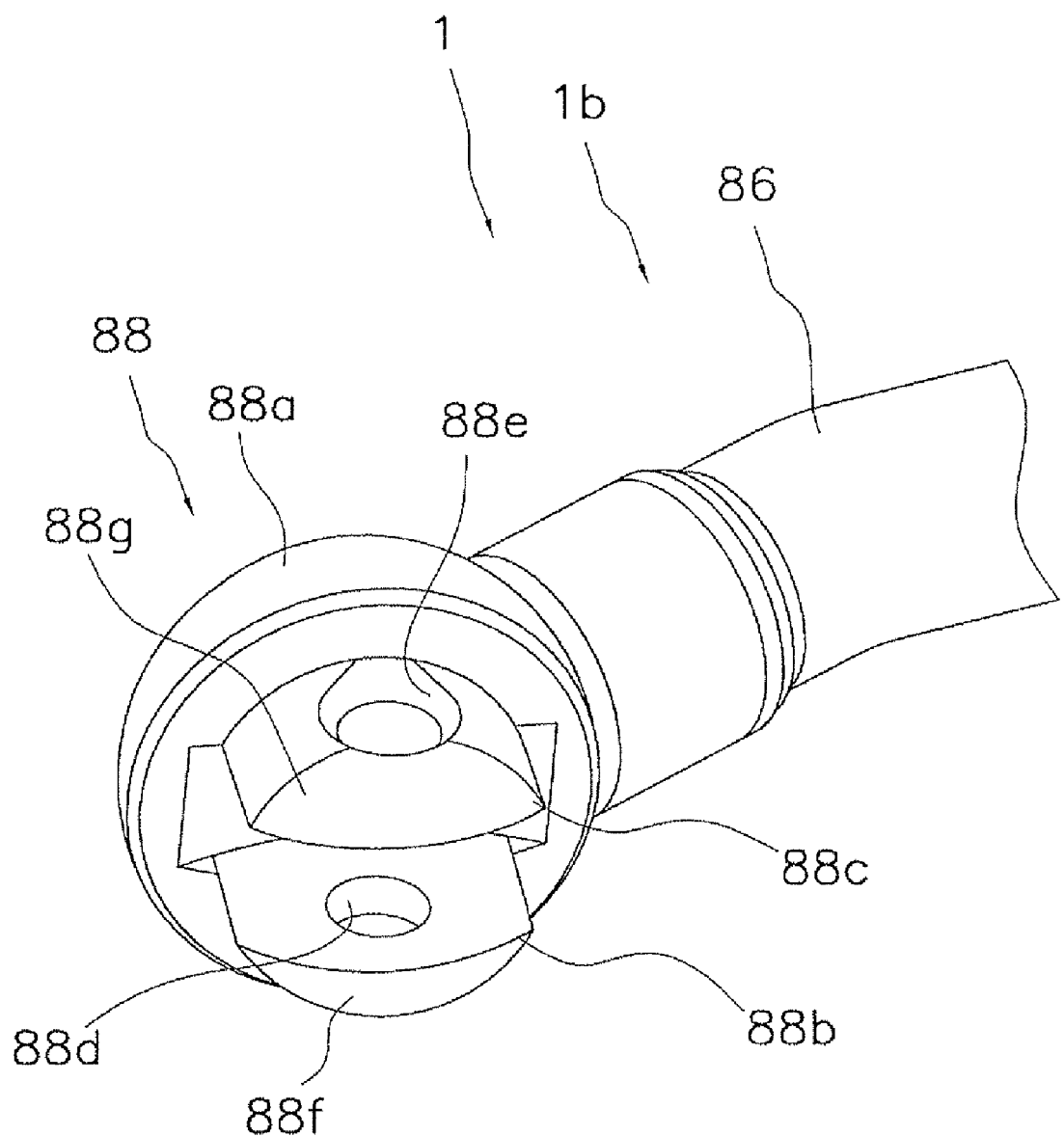
FIG. 11 is an enlarged perspective view of components related to the attachment of a handle arm of the handle.

As illustrated in FIGS. 10 and 11, the second attachment portion 88 is a portion for tightly fixing the distal end of the handle shaft 85 to the handle arm 1b by a pin member 89. The second attachment portion 88 includes a hemisphere 88a, a first protrusion 88b, and a second protrusion 88c. The hemisphere 88a has a hemispheric outer peripheral surface. The first and second protrusions 88b and 88c protrude inward from the inner surface (the surface opposed to or facing the reel unit 2) of the hemisphere 88a. A first through hole 88d is laterally formed in the first protrusion 88b, i.e., along a direction intersecting the handle shaft 85 and the protruding direction of the first protrusions 88b, whereas a second through hole 88e is laterally formed in the second protrusion 88c, i.e., along a direction intersecting the handle shaft 85 and the protruding direction of the second protrusions 88c. The first and second through holes 88d and 88e communicate with a through hole formed in the distal end of the handle shaft 85 (not illustrated in the figure). The handle shaft 85 is tightly fixed to the handle arm 1b by the pin member 89 inserted into these three through holes that communicate with each other. The first protrusion 88b includes a first outer surface 88f on the inner surface thereof, i.e., the surface opposed to or facing the reel unit 2 and simultaneously opposite to the outer peripheral surface of the hemisphere 88a, whereas the second protrusion 88c includes a second outer peripheral surface 88g on the inner surface thereof, i.e., the surface opposed to or facing the reel unit 2 and simultaneously opposite to the outer peripheral surface of the hemisphere 88a. The first and second outer surfaces 88f and 88g form a hypothetical spherical surface including the hemispheric outer peripheral surface of the hemisphere 88a. In other words, in three-dimensional Euclidean space, there exists a point that is located a fixed distance or substantially fixed distance from the points on the outer peripheral surface of the hemisphere 88a and on the first and second outer surfaces 88f and 88g. Further, a tubular handle guard 84 is attached between the reel unit 2 and the inner peripheral surface of the hemisphere 88a while being disposed on the outside of the outer periphery of the handle shaft 85, as depicted with a dotted line in FIG. 10. The handle guard 84 is attached thereon to cover entirely the first protrusion 88b, the second protrusion 88c, and the pin member 89. In this case, the structure prevents negative impact on the appearance design of the handle 1 because the handle guard 84 entirely covers the first protrusion 88b, the second protrusion 88c, and the pin member 89 as well as a T-slot groove formed in machining.

Figure 12:
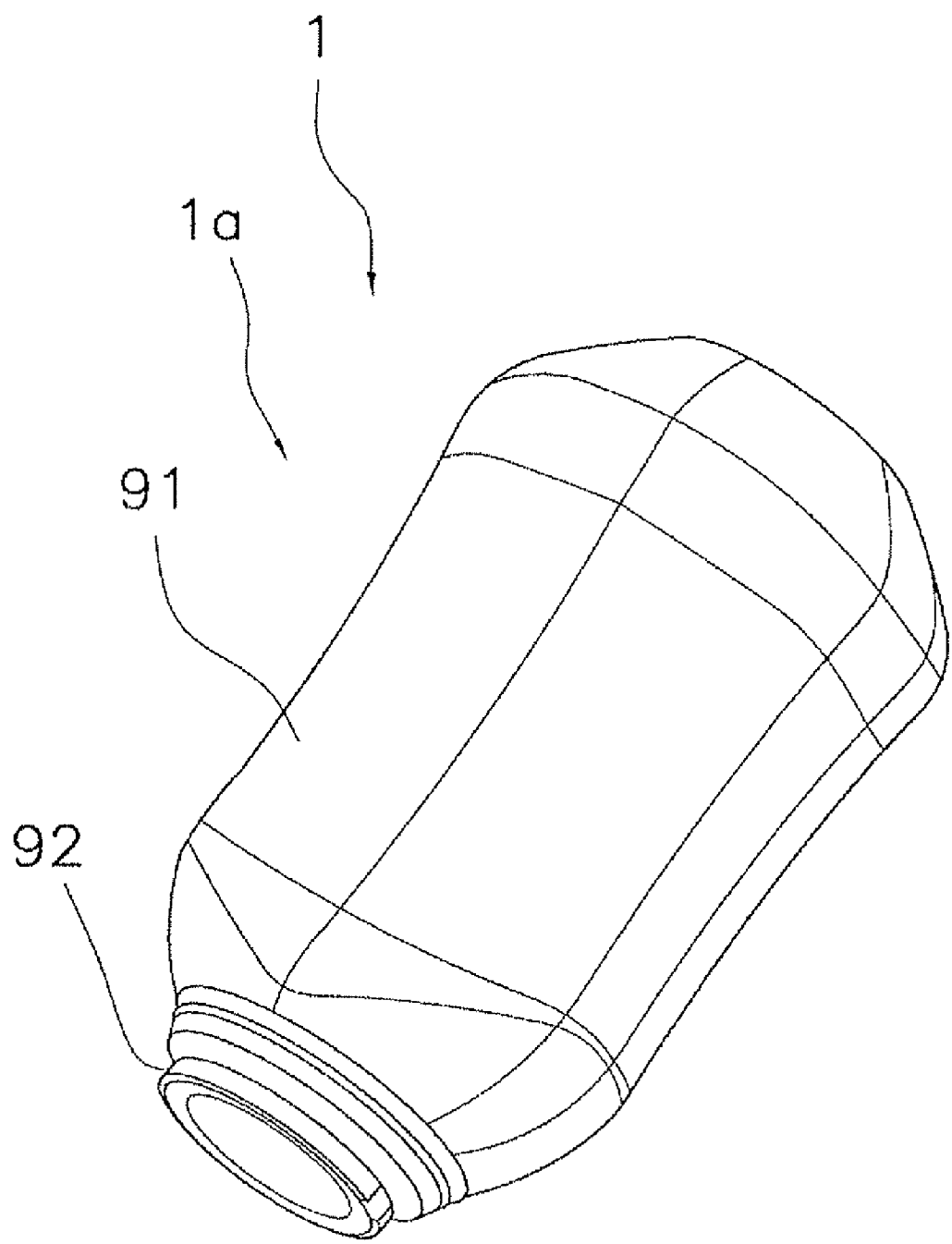
FIG. 12 is an enlarged perspective view of a handle knob of the handle.
Figure 13:
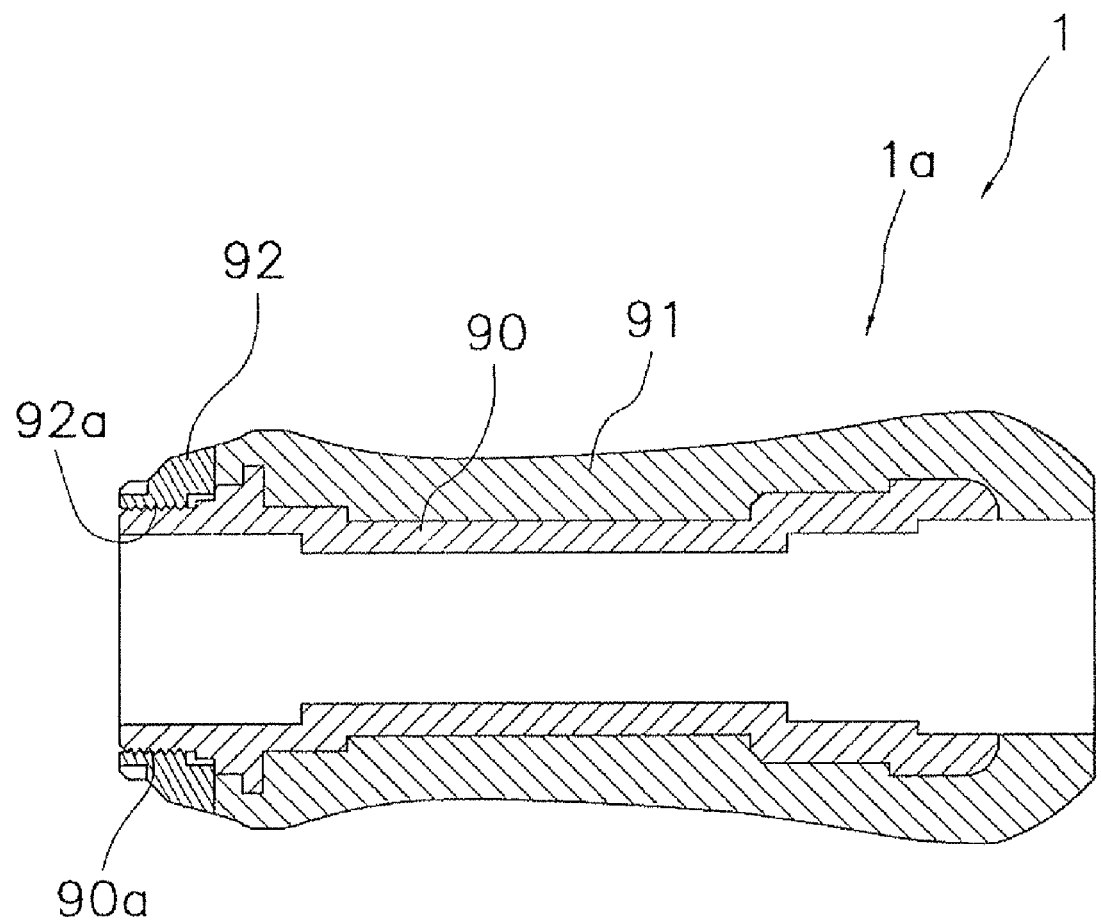
FIG. 13 is an enlarged cross-sectional side view of the handle knob.
Figure 14:
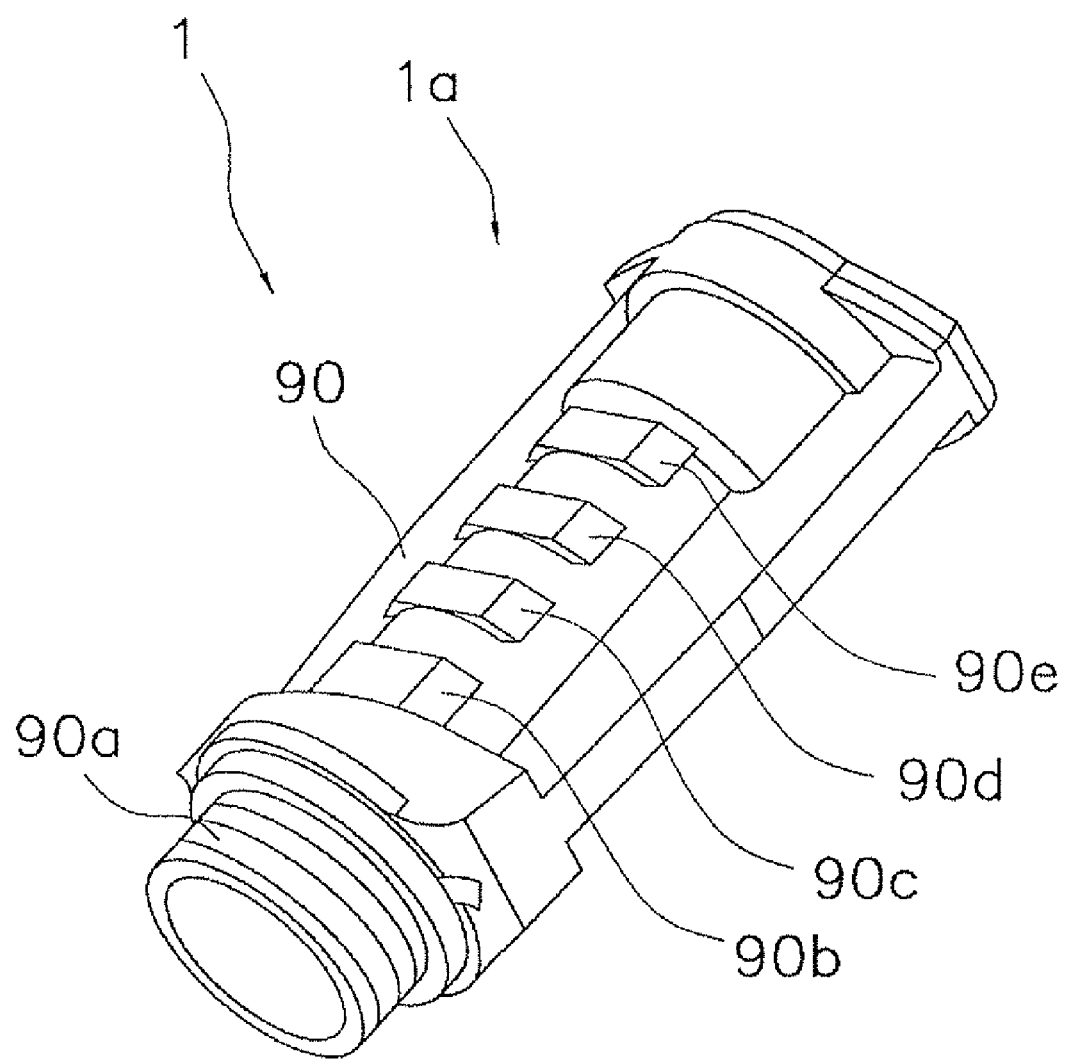
FIG. 14 is an enlarged perspective view of a tubular portion of the handle knob.

As illustrated in FIGS. 12 and 13, the handle knob 1a includes a tubular member 90, a knob member 91, and an annular member 92. The tubular member 90, made of synthetic rein, is attached to the knob shaft 1c while being allowed to rotate but prevented from axially moving relative to the knob shaft 1c. The knob member 91, made of synthetic resin, is attached to the tubular member 90 while covering the outer periphery of the tubular member 90. The annular member 92, made of aluminum alloy, is attached onto the outer periphery of the front end of the tubular member 90 while being disposed in front of the knob member 91. The tubular member 90 is made of synthetic resin such as polyacetal. The front end of the tubular member 90 has a roughly circular shape and allows the annular member 92 to be attached thereon. On the other hand, a rear portion of the tubular member 90, excluding the front end, is flattened in a roughly oval shape. The outer periphery of the rear portion of the tubular member 90 is herein insert-molded into the knob member 91. The tubular member 90 contains two bearings (not illustrated in the figures) in the opposed ends of the inner periphery thereof. The tubular member 90 is allowed to rotate with respect to the knob shaft 1c through the bearings. As illustrated in FIGS. 13 and 14, the tubular member 90 includes a male threaded portion 90a on the outer periphery of the end that attaches to the attachment portion 87. A female threaded portion 92a, formed on the inner periphery of the annular member 92, is screwed onto the male threaded portion 90a for attaching the annular member 92 to the tubular member 90. Further, the annular member 92 is fixed to the tubular member 90 by an adhesive material. Thus, the tubular member 90 is prevented from being exposed to the outside due to attachment of the annular member 92 to the tubular member 90. Good appearance design is thereby achieved for the handle knob 1a.

As illustrated in FIGS. 12 and 13, the knob member 91 is a member for insert-molding the tubular member 90 therein. The knob member 91 is made of soft rubber such as PVC (polyvinyl chloride) or SEPTON™. As illustrated in FIG. 14, the tubular member 90 includes a first protrusion 90b, a second protrusion 90c, a third protrusion 90d, and a fourth protrusion 90e on each of a pair of opposed surfaces of the outer periphery of the roughly-oval flatted rear portion to be insert-molded into the knob member 91. The first to fourth protrusions 90b to 90e protrude radially outwards from each of the opposed surfaces while being axially aligned. When the outer periphery of the tubular member 90 is insert-molded into the knob member 91, the first to fourth protrusions 90b to 90e serve to retain the knob member 91. The knob member 91, made of rubber, is accordingly prevented from being displaced radially outwards.

As illustrated in FIG. 2, the reel unit 2 includes a reel body 2a and a lid member 2b (see FIG. 1). The reel body 2a includes a space in the inside thereof. The lid member 2b is detachably attached to the reel body 2a to seal the inner space of the reel body 2a. Further, the reel unit 2 includes a reel-unit guard 2d to cover the rear portions of the reel body 2a and the lid member 2b.

As illustrated in FIG. 2, the reel body 2a includes a T-shaped fishing-rod attachment leg 2c extended upwards from the upper portion thereof in a back-and-forth direction. The reel body 2a is made of light metal alloy such as magnesium alloy or aluminum alloy. As illustrated in FIG. 2, the reel body 2a contains a rotor drive mechanism 5 and an oscillation mechanism 6 in the inner space thereof.

For example, the lid member 2b is made of light metal alloy, e.g., magnesium alloy or aluminum alloy. As illustrated in FIG. 1, the front part of the lid member 2b is fixed to the reel body 2a by two fixation bolts while the fixed portions are hidden by the rotor 3. On the other hand, the rear part of the lid member 2b, disposed away from the rotor 3, is fixed to the reel body 2a by a single fixation bolt.

As illustrated in FIG. 2, the rotor drive mechanism 5 includes a face gear 11 and a pinion gear 12. The face gear 11 is configured to rotate together with a master gear shaft 10 to which the handle 1 is fixed. The pinion gear 12 meshes with the face gear 11. The pinion gear 12 has a tubular shape. The front portion of the pinion gear 12 is fixed to the rotor 3 by a nut 13 while penetrating through the center of the rotor 3. The axial intermediate portion of the pinion gear 12 is supported by the reel unit 2 through a first bearing 14a while being allowed to rotate. Similarly, the axial rear end portion of the pinion gear 12 is supported by the reel unit 2 through a second bearing 14b while being allowed to rotate.

As illustrated in FIG. 2, the oscillation mechanism 6 is configured to move a spool shaft 15 back and forth. The spool shaft 15 is coupled to the center of the spool 4 through a drag mechanism 60 for moving the spool 4 back and forth. The oscillation mechanism 6 includes a helical shaft 21, a slider 22, and an intermediate gear 23. The helical shaft 21 is disposed below and parallel to the spool shaft 15. The slider 22 is configured to move back and forth along the helical shaft 21. The intermediate gear 23 is fixed to the distal end of the helical shaft 21. The rear end of the spool shaft 15 is fixed to the slider 22 and is prevented from rotating relative to slider 22. The intermediate gear 23 meshes with the pinion gear 12.

As illustrated in FIG. 2, the rotor 3 includes a rotor unit 7, a first cover member 33, and a pair of a second cover member 34 and a third cover member 35. The rotor unit 7 is allowed to rotate with respect to the reel unit 2 about an axis extending along the back-and-forth direction. The first cover member 33 covers the rear part of the rotor unit 7. The second cover member 34 covers the outer surface of a first rotor arm 31, whereas the third cover member 35 covers the outer surface of a second rotor arm 32.

As illustrated in FIG. 2, the rotor unit 7, made of aluminum alloy, for instance, is coupled to the pinion gear 12 while being prevented from relatively rotating. However, the rotor unit 7 is allowed to rotate with respect to the reel unit 2. The rotor unit 7 includes a tubular portion 30, the first rotor arm 31, and the second rotor arm 32. The tubular portion 30 includes a recess in the rear part thereof to contain a cylindrical portion formed as the front portion of the reel unit 2. The first and second rotor arms 31 and 32 are connected to the opposed positions on the rear part of the tubular portion 30. Each of the first and second rotor arms 31 and 32 extends forward while being separated from the tubular portion 30 by a predetermined distance.

As illustrated in FIG. 2, the tubular portion 30 includes a disc-shaped wall on the inner periphery of the front part thereof. Further, the wall includes an annular boss on the center thereof. The boss is connected to the pinion gear 12 while being allowed to rotate unitarily with the pinion gear 12. The front part of the pinion gear 12 is engaged with the center of the boss while being prevented from relatively rotating. Further, the nut 13 is screwed onto the distal end of the pinion gear 12. The rotor unit 7 is thereby fixed to the pinion gear 12. As illustrated in FIG. 2, a fifth bearing 58 is disposed between the inner periphery of the tip of the nut 13 and the outer periphery of the spool shaft 15. Further, a collar member 59, made of brass, is interposed between the inner periphery of the fifth bearing 58 and the outer periphery of the spool shaft 15, as illustrated in FIG. 9.

Figure 9:
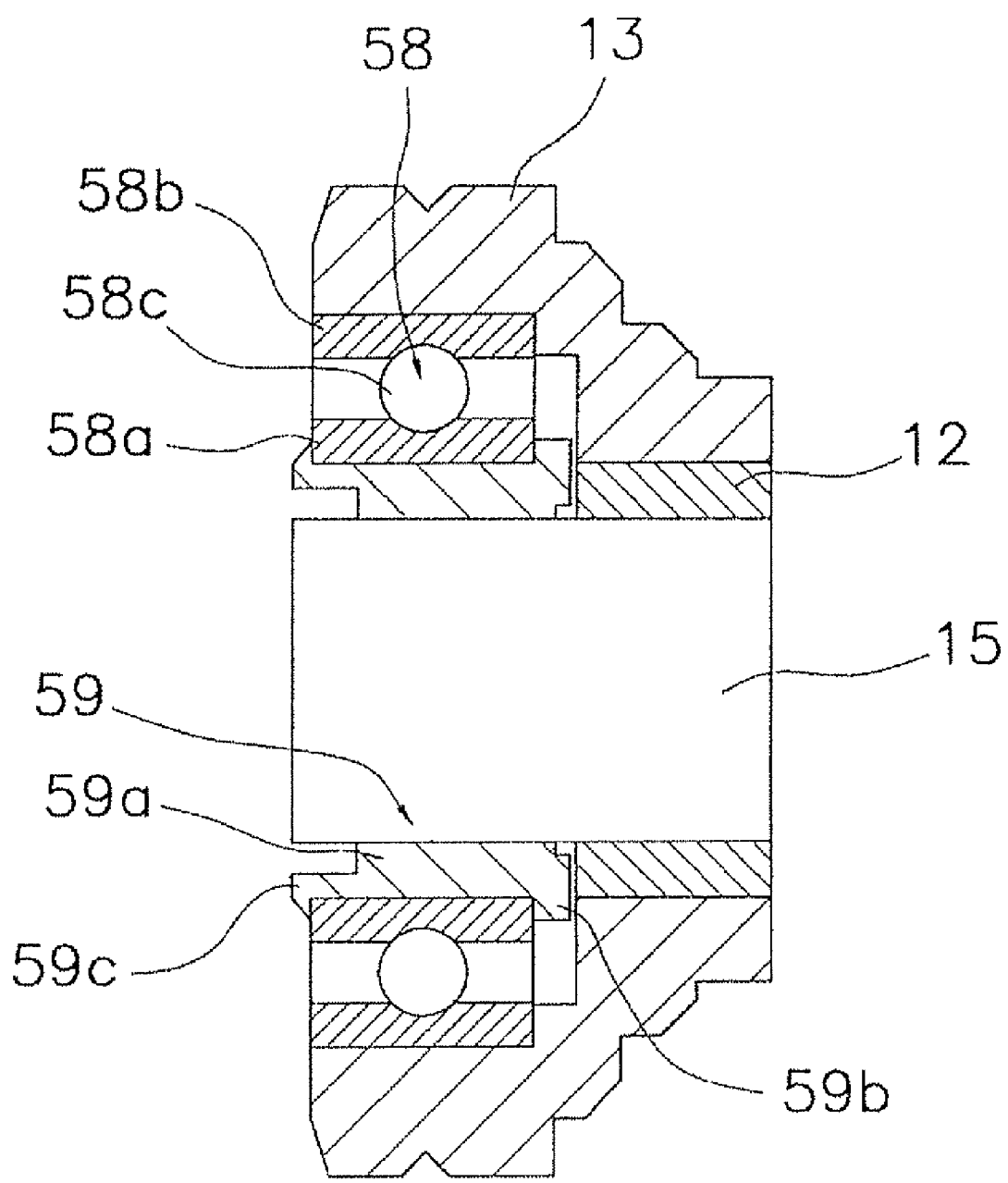
FIG. 9 is an enlarged cross-sectional side view of components related to the attachment of a rotor in the spinning reel.

As illustrated in FIG. 9, the fifth bearing 58 is a ball bearing including an inner race 58a, an outer race 58b, and rolling elements 58c. The inner race 58a is disposed on the outer peripheral side of the spool shaft 15. The outer race 58b is disposed onto the inner periphery of the tip of the nut 13. The rolling elements 58c are balls disposed between the inner race 58a and the outer race 58b. As illustrated in FIG. 9, the collar member 59 includes a tubular portion 59a, a protruding portion 59b, and a tightly fitting portion 59c. The protruding portion 59c protrudes radially outwards from the base end, i.e., the right-side end in FIG. 9, of the tubular portion 59a to make contact with the base end of the inner race 58a of the fifth bearing 58. The tightly fitting portion 59c is a front end portion, i.e., the left-side end portion in FIG. 9 of the tubular portion 59a for tightly fixing the collar member 59 to the fifth bearing 58. The tightly fitting portion 59c is bent radially outwards to retain the tip of the inner race 58a of the fifth bearing 58 under the condition that the fifth bearing 58 is attached onto the tubular portion 59a. Thus, the fifth bearing 58 and the collar member 59 are herein attached between the inner periphery of the tip of the nut 13 and the outer periphery of the spool shaft 15 while the collar member 59 is tightly fixed to the fifth bearing 58. Minute wobble can be herein reliably inhibited between the fifth bearing 58 and the collar member 59 due to the structure in which the collar member 59 is tightly fitted to the fifth bearing 58.

As seen in FIG. 2, the first cover member 33 is structured to cover the rear part of the rotor unit 7 while being disposed in the surrounding of the tubular portion 30. The second cover member 34 covers the first rotor arm 31 from the outside while being coupled to the first rotor arm 31 by a fixation bolt screwed into the first rotor arm 31.

As illustrated in FIG. 2, the second cover member 34 is joined to the first cover member 33 and the first rotor arm 31 to form a three-dimensional curved plane. The distal end of the second cover member 34 is cut out in a roughly semicircular shape to dispose a first bail support member 40 to be described therein.

As illustrated in FIG. 2, the third cover member 35 covers the second rotor arm 32 from the outside while being fixed to the second rotor arm 32 by a pair of a fixation bolt and a nut member screwed onto the fixation bolt. Similarly to the second cover member 34, the third cover member 35 is joined to the first cover member 33 and the second rotor arm 32 to form a three-dimensional curved plane. The fixation bolt herein has a function of supporting a second bail support member 42 (to be described) while allowing it to pivot, as well as a function of fixing the third cover member 35 to the rotor unit 7.

As illustrated in FIG. 2, the first bail support member 40 is attached to the outer surface of the distal end of the first rotor arm 31 while being allowed to pivot relative to the first rotor arm 31. A line roller 41, configured to guide the fishing line to the spool 4, is attached to the tip of the first bail support member 40. On the other hand, the second bail support member 42 is attached to the outer surface of the distal end of the second rotor arm 32 while being allowed to pivot. A bail 43, formed by bending a wire rod in a roughly U shape, is fixed between the line roller 41 and the second bail support member 42. The aforementioned components, i.e., the first bail support member 40, the second bail support member 42, the line roller 41 and the bail 43 form a bail arm 44 for guiding the fishing line onto the spool 4. The bail arm 44 is configured to pivot between a fishing-line guide posture illustrated in FIG. 2 and a fishing-line release posture flipped from the fishing-line guide posture.

Figure 3:
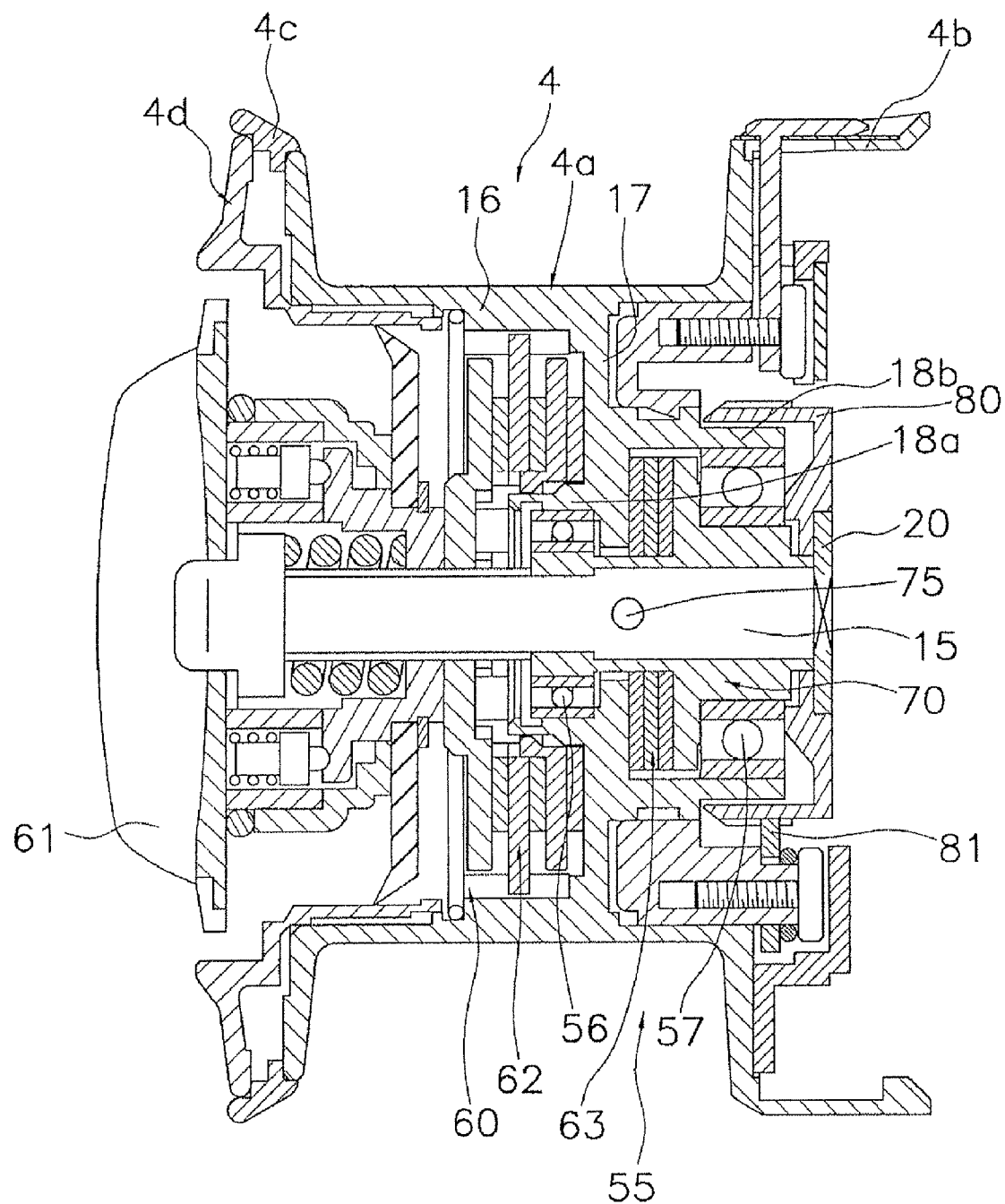
FIG. 3 is an enlarged cross-sectional side view of a spool of the spinning reel.

As illustrated in FIGS. 1 to 3, the bail arm 44 is attached to the distal ends of the first and second rotor arms 31 and 32 while being allowed to pivot between the fishing-line guide posture and the fishing-line release posture. The bail arm 44 includes the first bail support member 40, attached to the distal end of the first rotor arm 31 while being allowed to pivot relative to the first rotor arm 31, and the second bail support member 42, attached to the distal end of the second rotor arm 32 while being allowed to pivot relative to the second rotor arm 32.

The first bail support member 40 is attached to the outer surface of the first rotor arm 31 while being allowed to pivot relative to the first rotor arm 31. Similarly, the second bail support member 42 is attached to the outer surface of the second rotor arm 32 while being allowed to pivot relative to the second rotor arm 32. As illustrated in FIGS. 1 and 2, the bail arm 44 includes the bail 43, a fixation shaft 45, the line roller 41, and a fixation shaft cover 46. The bail 43 connects the first bail support member 40 and the second bail support member 42. The fixation shaft 45 is fixed to the first bail support member 40 with the tip thereof. The line roller 41 is supported by the fixation shaft 45. The fixation shaft cover 46 covers the fixation shaft 45.

As illustrated in FIG. 2, the tubular portion 30 of the rotor 3 contains an anti-reverse mechanism 50. The anti-reverse mechanism 50 is configured to prevent and to allow reverse rotation of the rotor 3. The anti-rotation mechanism 50 includes a one-way clutch 51 and a switch mechanism 52. The one-way clutch 51 is a roller clutch having an inner race configured to rotate freely. The switch mechanism 52 is configured to switch the one-way clutch 51 between an activation state, i.e., a reverse-rotation prevention state, and a deactivation state, i.e., a reverse-rotation permission state.

As illustrated in FIG. 2, the spool 4 is disposed between the first and second rotor arms 31 and 32 of the rotor 3. The spool 4 is also attached to the distal end of the spool shaft 15 through the drag mechanism 60. As illustrated in FIG. 3, the spool 4 includes a bobbin trunk 4a, a skirt 4b, a front flange 4c, and a front-flange fixation member 4d. The bobbin trunk 4a allows the fishing line to be wound around the outer periphery thereof. The skirt 4b is a tubular portion disposed behind and integrally formed with the bobbin trunk 4a. The bobbin trunk 4a and skirt 4b can be a one-piece unitary member. The front flange 4c is a large-diameter portion attached to the front end of the bobbin trunk 4a. The front-flange fixation member 4d is configured to fix the front flange 4c to the bobbin trunk 4a.

As illustrated in FIG. 3, the bobbin trunk 4a and the skirt 4b form a cylindrical member with dual steps, i.e., small and large steps, obtained by forging and machining aluminum alloy, for instance. The bobbin trunk 4a and the skirt 4b are attached to the spool shaft 15 through a third bearing 56 and a fourth bearing 57 while being allowed to rotate.

As illustrated in FIG. 3, the bobbin trunk 4a includes a tubular portion 16, a wall portion 17, a first protruding portion 18a, and a second protruding portion 18b. The tubular portion 16 has a tubular shape and allows the fishing line to be wound around the outer periphery thereof. The wall portion 17 is an annular portion integrally molded with the tubular portion 16 while being formed on the inner peripheral side of the rear end of the tubular portion 16. The first protruding portion 18a is a tubular portion that protrudes forward from the wall portion 17. The first protruding portion 18a contains the third bearing 56 on the inner periphery thereof. The second protruding portion 18b is a tubular portion that protrudes rearward from the wall portion 17. The second protruding portion 18b contains the fourth bearing 57 on the inner periphery thereof. A bearing section 55 is made up of the third bearing 56 attached to the inside of the first protruding portion 18a and the fourth bearing 57 attached to the inside of the second producing portion 18b. The bearing section 55 is attached to the spool shaft 15 through a tubular retainer member 70 while being allowed to rotate. The retainer member 70 abuts a spool receiver 20 with the rear end thereof. The spool receiver 20 is attached to the retainer member 70 while being prevented from moving rearward relative to the retainer member 70.

Figure 4:
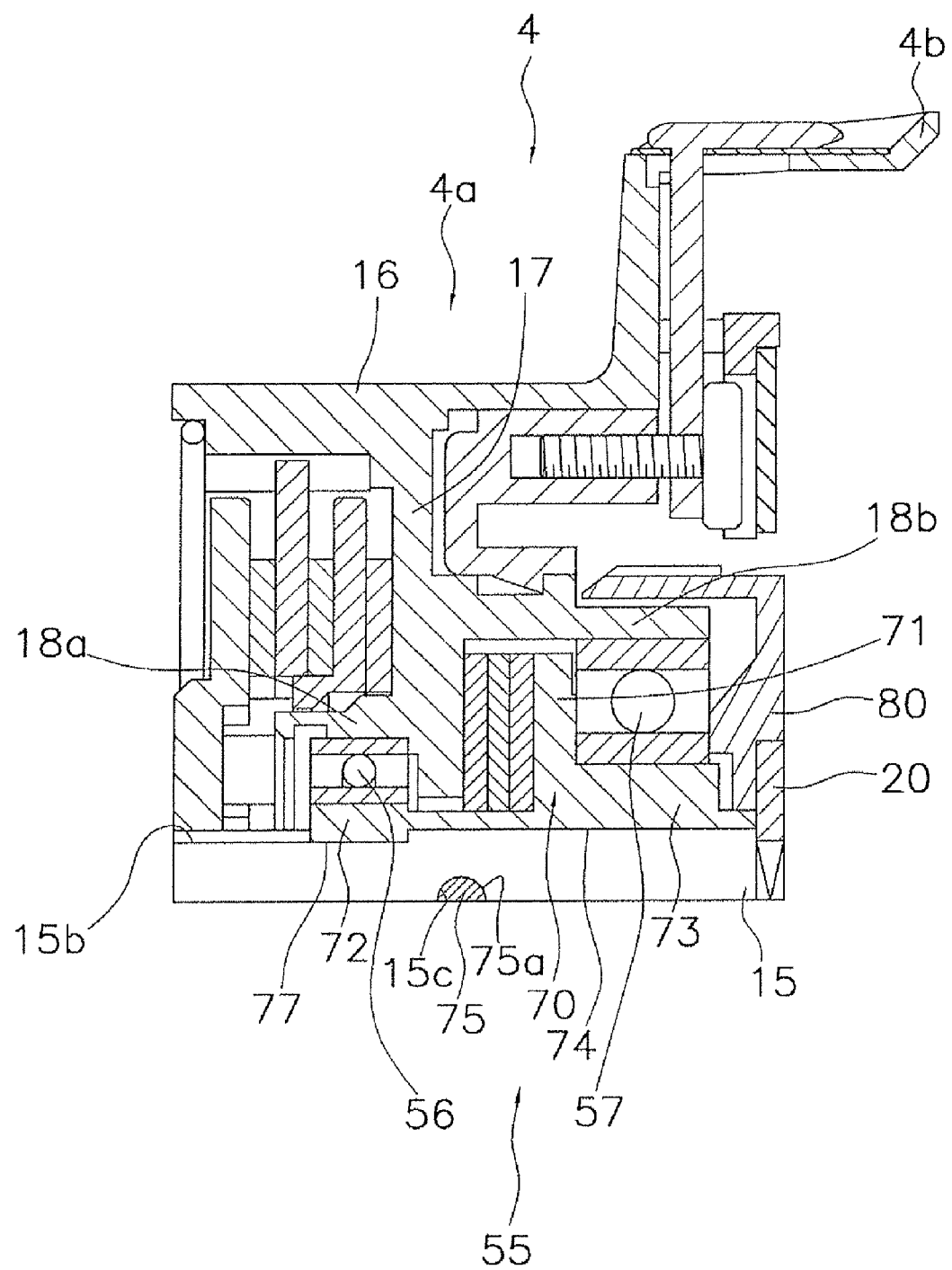
FIG. 4 is an enlarged partial cross-sectional side view of a retainer member and the periphery thereof in the spool.

As illustrated in FIG. 4, the spool receiver 20 is a metal ring member attached to the spool shaft 15 while being prevented from moving back and forth relative to the spool shaft 15. The spool receiver 20 indirectly abuts the rear end of the fourth bearing 57. Even when the drag mechanism 60 presses the wall portion 17 rearward, the spool receiver 20 can receive the entire spool 4 due to the structure in which the spool receiver 20 is fixed to the spool shaft 15.

As illustrated in FIG. 4, the retainer member 70 is a tubular member that abuts the spool receiver 20 with the rear end thereof. Further, a tubular sound producing member 80 has a rear end that abuts the spool receiver 20 on a portion radially outside the portion at which the retainer member 70 abuts the spool receiver 20 (see FIGS. 3 and 4). The retainer member 70 is configured to be pressed rearward by the wall portion 17. The sound producing member 80 is configured to produce sounds when a sound producing pin 81 (see FIG. 3) repeatedly makes contact with it. The outer periphery of the retainer member 70 retains the bearing section 55, whereas the inner periphery of the retainer member 70 is attached to a non-circular portion 15b of the spool shaft 15 while being allowed to rotate unitarily with it. The non-circular portion 15b is a front end portion of the spool shaft 15 and has a non-circular cross section. Specifically, the outer peripheral cross section of the non-circular portion 15b of the spool shaft 15 is a roughly oval shape. The cross-sectional shape of the non-circular portion 15b is obtained by longitudinally cutting a pair of opposed lateral portions of a columnar member with a pair of parallel planes.

As illustrated in FIGS. 4 to 8, the retainer member 70 includes a first retainer portion 72, a second retainer portion 73, a disc portion 71, a through hole 74, a through hole 76, and a non-circular cross-sectional portion 77. The first retainer portion 72 allows the third bearing 56 to be disposed on the outer periphery thereof. The first retainer portion 72 has a thick part or front end and thin part disposed behind the thick part or front end. The second retainer portion 73 is disposed rearward of the first retainer portion 72. The second retainer portion 73 allows the fourth bearing 57 to be disposed on the outer periphery thereof. The disc portion 71 is disposed between the first retainer portion 72 and the second retainer portion 73. The disc portion 71 has an outer periphery having a diameter greater than the diameters of either of the first and second retainer portions 72 and 73. Further, the distance from an inner periphery to an outer periphery of the disc portion 71 can be greater than the respective distances of either the first and second retainer portions 72 and 73, and can be greater than the sum of the respective distances. Further, an outer periphery of a portion of the thin part of the first retainer portion 72 is smaller than the outer periphery of the thick part of the first retainer portion 72. The through hole 74 has a circular axial cross section. The through hole 74 allows the non-circular portion 15b of the spool shaft 15 to penetrate axially or to pass through the inner periphery thereof when the spool shaft 15 is inserted therein from the rear side. The through hole 76 radially penetrates the first retainer portion 72 and allows a pin member (fixation member) 75 to penetrate therethrough. More specifically, the through hole 76 radially penetrates the thin part of the retainer portion 72. The non-circular cross-sectional portion 77 is formed by cutting out the front end of the first retainer portion 72 to penetrate radially therethrough by milling. The non-circular cross-sectional portion 77 has a non-circular axial cross section to allow the non-circular portion 15b of the spool shaft 15 to be engaged therewith. The retainer member 70 is fixed to the spool shaft 15 by the pin member 75 while being prevented from axially moving relative to the spool shaft 15.

Figure 5:
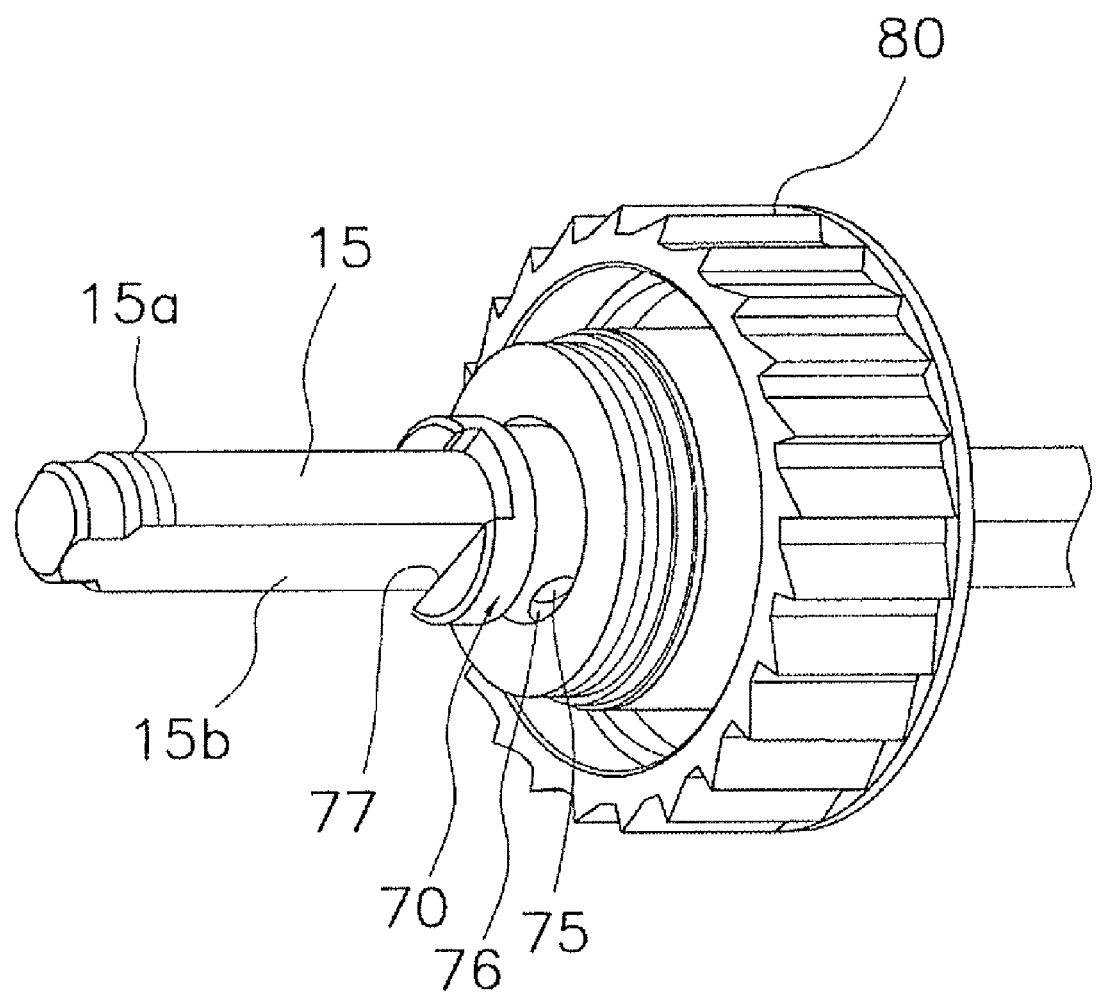
FIG. 5 is an enlarged perspective view of components related to the attachment of the retainer member.
Figure 6:
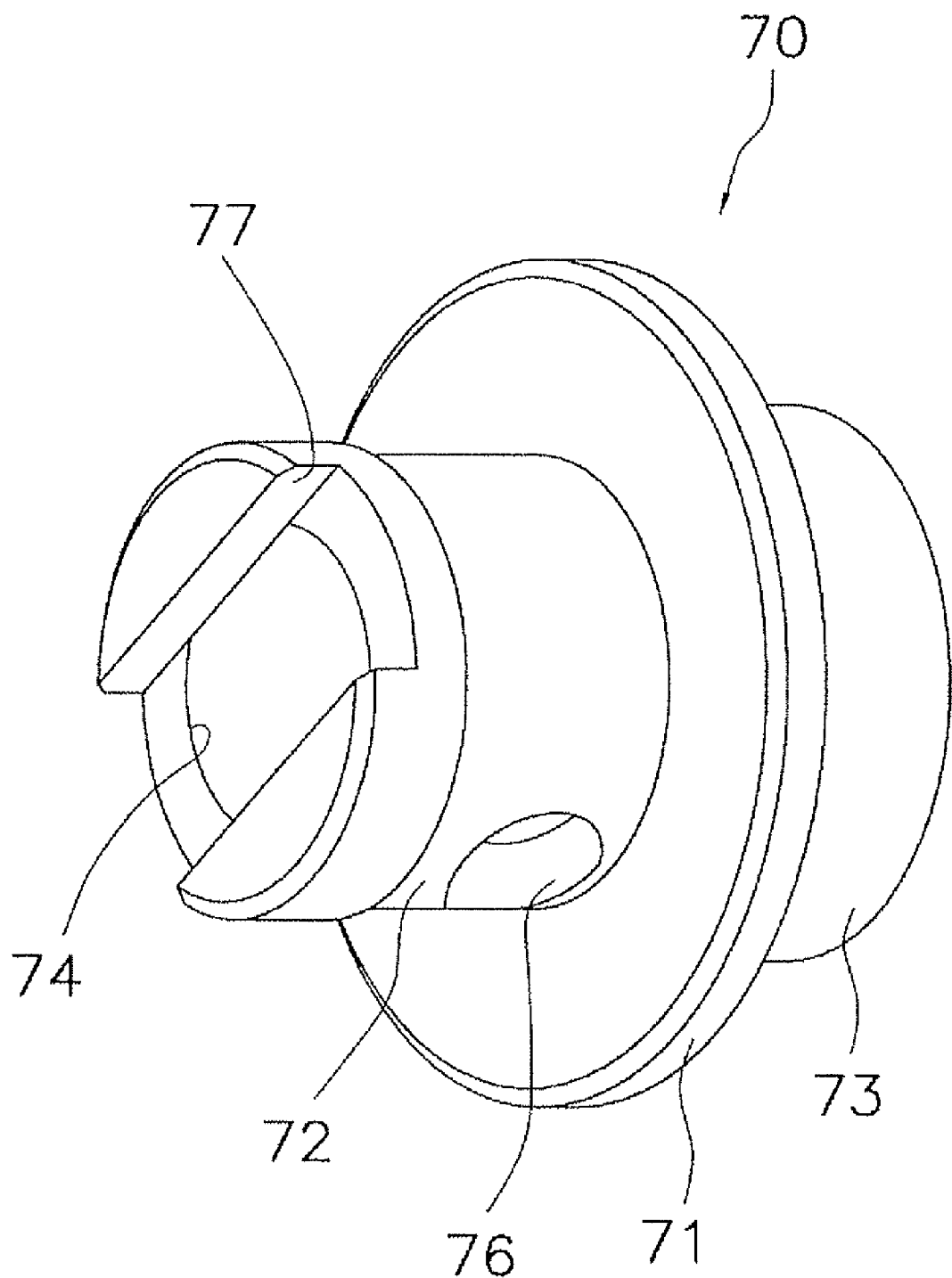
FIG. 6 is an enlarged perspective view of the retainer member.
Figure 7:
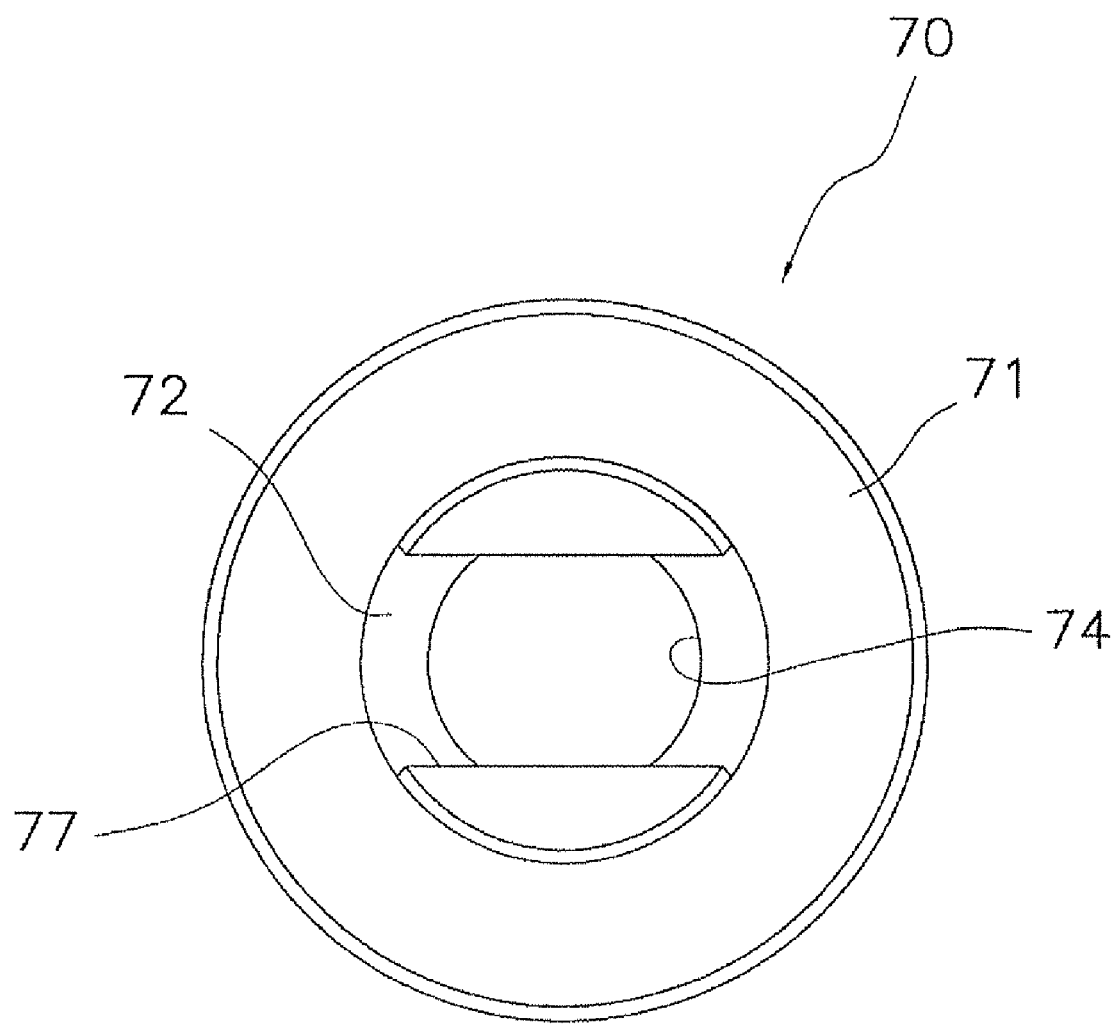
FIG. 7 is an enlarged front view of the retainer member.
Figure 8:
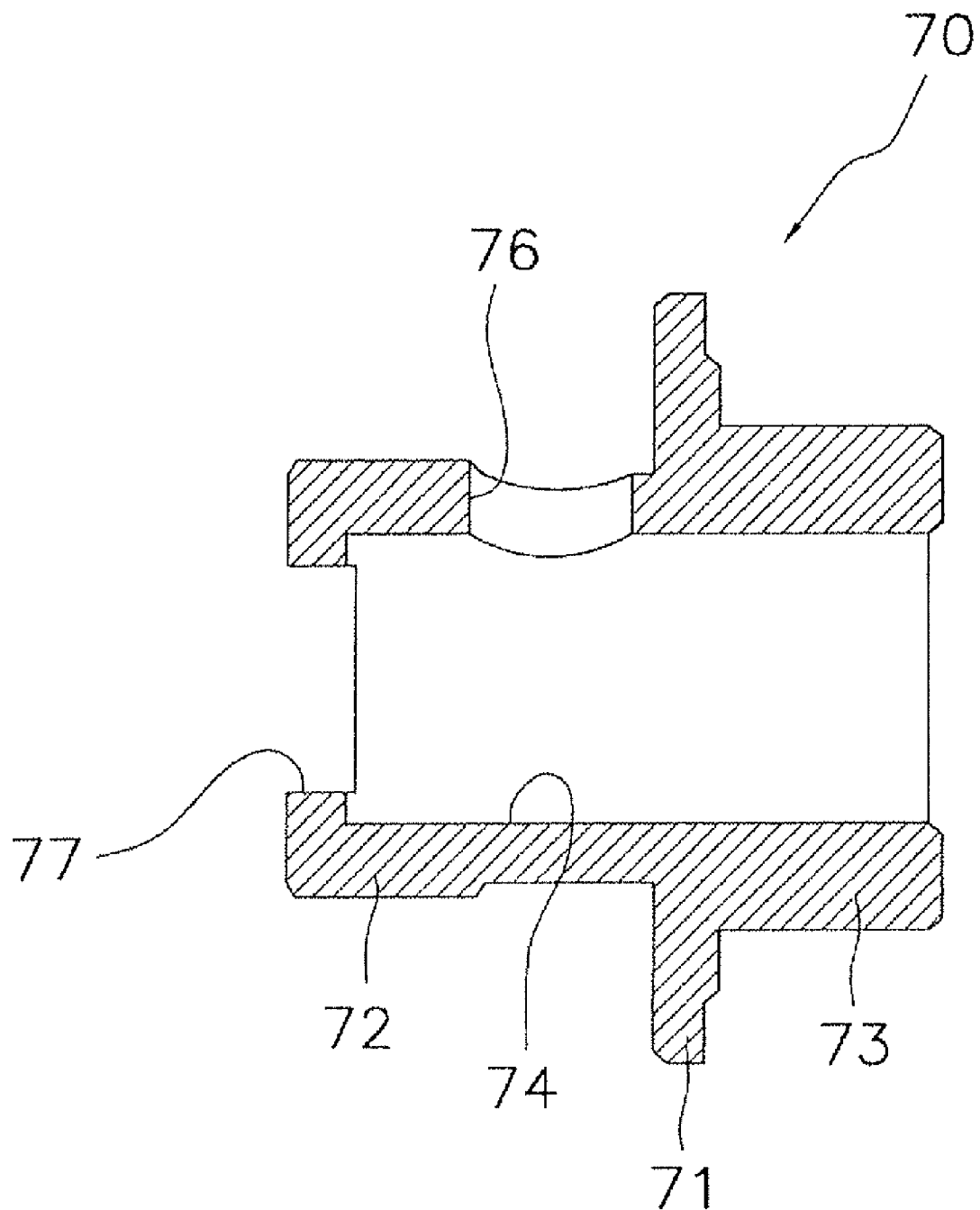
FIG. 8 is an enlarged cross-sectional side view of the retainer member.

As illustrated in FIGS. 4, 6 and 8, the first retainer portion 72, the disc portion 71, and the second retainer portion 73 are integrally molded with aluminum alloy to form a single member and to include the through hole 74 axially penetrating the inner radial part thereof. The alumite treatment is made for the outer peripheries of the first retainer portion 72, the disc portion 71, and the second retainer portion 73. A plurality of adjusting washers 63 for adjusting a back and forth position of the spool 4 is disposed about an outer periphery of the first retainer portion 72 on the front side of the disc portion 71, and abuts the front surface of the disc portion 71. In other words, the adjusting washers 63 are disposed on an outer periphery of the thin part of the first retainer portion 72 and abut the front surface of the disc portion 71. The second retainer portion 73 has an outer diameter greater than the outer diameter of the first retainer portion 72. The second retainer portion 73 is thereby allowed to retain the fourth bearing 57 having a diameter greater than the diameter of the third bearing 56. The through hole 74 is a circular through hole allowing the non-circular portion 15b of the spool shaft 15 to pass therethrough. The through hole 74 has an inner diameter slightly greater than the outer diameter of a circular portion of the spool shaft 15. As illustrated in FIGS. 4 to 8, the spool shaft 15 further includes a female threaded hole 15c (see FIG. 4) along a radial direction thereof. The female threaded hole 15c communicates with the through hole 76 (see FIGS. 5, 6 and 8) formed in the first retainer portion 72. A male threaded portion 75a (see FIG. 4) of the pin member 75, e.g., a hexagonal socket locking screw, is screwed into the female threaded hole 15c of the spool shaft 15. The retainer member 70 is thereby fixed to the spool shaft 15 while being prevented from axially moving. The first retainer portion 72 includes the non-circular cross-sectional portion 77 on the front end thereof. The non-circular cross-sectional portion 77 is formed by cutting out the front end of the first retainer portion 72 by milling. Accordingly, the non-circular cross-sectional portion 77 radially penetrates or extends at the front end of the first retainer portion 72. The non-circular cross-sectional portion 77 has a non-circular axial cross section to allow the non-circular portion 15b of the spool shaft 15 to be engaged therewith.

As illustrated in FIGS. 4 to 8, the non-circular cross-sectional portion 77 is formed by cutting out the front end of the first retainer portion 72 by milling to produce a pair of parallel-opposed surfaces, i.e., surfaces that face or oppose and extend parallel to one another. The distance between the parallel-opposed surfaces is less than the diameter of the through hole 74. As illustrated in FIGS. 5 to 7, the non-circular cross-sectional portion 77 is formed by cutting out the center portion of the circular front end of the first retainer portion 72 in a roughly oval shape. Accordingly, a pair of symmetric roughly arc-shaped portions (see FIGS. 6 and 7) is left on the both lateral sides of the cut-out center portion of the first retainer portion 72. As illustrated in FIG. 5, a distance between a pair of the parallel-opposed surfaces of the non-circular cross-sectional portion 77 is set to be the same as the distance between a pair of the parallel surfaces of the non-circular portion 15b of the spool shaft 15. Accordingly, a pair of the parallel-opposed surfaces of the non-circular cross-sectional portion 77 is allowed to be fitted with a pair of the parallel surfaces of the spool-shaft non-circular portion 15b without a clearance. Thus, when assembled, the parallel-opposed surfaces of the non-circular cross-sectional portion 77 firmly contacts the spool-shaft non-circular portion 15b. The non-circular cross-sectional portion 77 is formed by milling a pair of opposed surfaces based on the outer diameter (or the inner diameter) of the first retainer portion 72 as a processing reference. In this case, the outer diameter (or the inner diameter) of the first retainer portion 72 can be shared as the common processing reference for a pair of the parallel-opposed surfaces of the non-circular cross-sectional portion 77 and the inner diameter (or the outer diameter) of the first retainer portion 72. Therefore, the engaged portion of the non-circular cross-sectional portion 77 with the non-circular portion 15b of the spool shaft 15 can be easily formed with high accuracy.

As illustrated in FIGS. 2 and 3, the skirt 4b is integrally or unitarily molded in a tubular shape with the bobbin trunk 4a to cover the tubular portion 30 of the rotor 3. The skirt 4b is formed by processing a thin metal plate obtained by drawing of aluminum alloy.

As illustrated in FIG. 3, the front flange 4c is a scratch-resistant annular member made of metal or hard ceramics. The front flange 4c is slanted to expand the diameter thereof foreward. The front flange 4c is interposed and fixed between the bobbin trunk 4a and the front flange fixation member 4d. The front flange fixation member 4d is screwed into a female threaded portion formed on the front-end inner periphery of the tubular portion 16 of the bobbin trunk 4a.

As illustrated in FIG. 3, the front flange fixation member 4d includes a tubular male threaded portion on the rear-end outer periphery thereof. The male threaded portion is screwed into the female threaded portion of the bobbin trunk 4a. The male threaded portion is allowed to contain the plural drag plates 62 of the drag mechanism 60 in the inner peripheral space thereof.

As illustrated in FIG. 2, the drag mechanism 60 is configured to brake rotation of the spool 4. The drag mechanism 60 includes a drag regulation knob 61 and the drag plates 62. The drag regulation knob 61 is screwed onto a male threaded portion 15a (see FIG. 5) formed on the tip of the spool shaft 15. The drag plates 62 are configured to brake the spool 4 when pressed by the drag regulation knob 61.

Next, operations and actions of the spinning reel will be explained.

In casting, the bail arm 44 is flipped to the fishing-line release posture and the first and second bail support members 40 and 42 are thereby pivoted. Under this condition, an angler casts a fishing rod while hooking the fishing line with the index finger of his/her hand grasping the fishing rod. The fishing line is accordingly released with high momentum due to the weight of a tackle. When the handle 1 is rotated in the fishing-line winding direction after the tackle lands in water, the rotor drive mechanism 5 rotates the rotor 3 in the fishing-line winding direction. A bail tripping mechanism (not illustrated in the figures) returns the bail arm 44 to the fishing-line winding posture. Reverse rotation of the rotor 3 is thereby prevented. Accordingly, release of the fishing line is stopped.

When winding the fishing line, the handle 1 is rotated in the fishing-line winding direction. Rotation of the handle 1 is transmitted to the rotor 3 through the face gear 11 and the pinion gear 12. The rotor 3 is accordingly rotated. When the rotor 3 is rotated, the fishing line, guided to the line roller 41, is wound onto the spool 4.

According to the foregoing spool 4, the retainer member 70 includes the non-circular cross-sectional portion 77. The non-circular cross-sectional portion 77 is formed by cutting out the front end of the first retainer portion 72 by milling. The non-circular cross-sectional portion 77 radially penetrates or extends at the front end of the first retainer portion 72. The non-circular cross-sectional portion 77 has a non-circular axial cross section to allow the non-circular portion 15b of the spool shaft 15 to be engaged therewith. Thus, the non-circular cross-sectional portion 77 of the retainer member 70 is formed to engage with the non-circular portion 15b of the spool shaft 15. Therefore, the inner periphery of the first retainer portion 72 and the non-circular portion 15b of the spool shaft 15 can be fitted without any clearance.

This prevents wobble of the retainer member 70. Further, the non-circular cross-sectional portion 77 is herein formed by cutting out the front end of the first retainer portion 72 by milling for radially penetrating the front end of the first retainer portion 72. Simultaneously, the non-circular cross-sectional portion 77 includes a pair of parallel-opposed surfaces. Therefore, the outer diameter (or the inner diameter) of the first retainer portion 72 can be shared as the common processing reference for a pair of the parallel-opposed surfaces of the non-circular cross-sectional portion 77 and the inner diameter (or the outer diameter) of the first retainer portion 72. Therefore, the engaged portion of the non-circular cross-sectional portion 77 with the non-circular portion 15b of the spool shaft 15 can be easily formed with high accuracy. Consequently, wobble of the retainer member 70 can be prevented easily and reliably.

Other Exemplary Embodiments (a) The shallow spool has been exemplified in the aforementioned exemplary embodiment. However, the spool of the present invention is not limited to the above. The present invention is applicable to any other suitable spinning-reel spools.

(b) In the aforementioned exemplary embodiment, two bearings, i.e., the third and fourth bearings 56 and 57, are used as the bearing section 55. However, the bearing section 55 is not limited to the above. For example, only a single bearing may be used as the bearing section 55.

(c) In the aforementioned exemplary embodiment, the pin member 75, e.g., a hexagonal socket locking screw, is used for fixing the retainer member 70 to the spool shaft 15. However, the method of fixing the retainer member 70 to the spool shaft 15 is not limited to the above.

(d) In the aforementioned exemplary embodiment, the spool receiver 20 is a metal ring member. However, the spool receiver 20 may include a convexo-concave portion on the periphery thereof. Further, the spool receiver 20 may be provided with a sound producing mechanism configured to make contact with the convexo-concave portion of the spool receiver 20 in conjunction with rotation of the spool 4.

(e) In the aforementioned exemplary embodiment, the non-circular cross-sectional portion 77 is formed by milling. However, the non-circular cross-sectional portion 77 may be formed by any other suitable machining methods.

(f) In the aforementioned exemplary embodiment, the non-circular cross-sectional portion 77 is cut out to have a pair of the parallel-opposed surfaces. However, the shape of the non-circular cross-sectional portion 77 is not limited to the above as long as the non-circular cross-sectional portion 77 is formed by cutting out the front end of the first retainer portion 72 by machining to have a non-circular axial cross section allowing the non-circular portion 15b of the spool shaft 15 to be engaged therewith.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a spinning reel. Accordingly, these terms, as utilized to describe the present invention should be interpreted relative to a spinning reel equipped with a spinning reel support structure as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spinning reel spool support structure movably attached to a reel unit to move in a back-and-forth direction relative to the spool to allow a spool to be rotatably attached onto a spool shaft having a non-circular portion with a non-circular axial cross section at least in a front end portion thereof, the spinning reel spool support structure comprising:
    a bearing section disposed on an inner periphery of the spool, the bearing section supporting the spool to allow the spool to rotate relatively;
    a retainer member having
        a retainer portion having an outer periphery, the bearing section being disposed on an outer periphery of the retainer portion,
        a through hole having a circular axial cross section and an inner periphery, the inner periphery of the through hole being axially penetrated by the non-circular portion of the spool shaft from back to front, and
        a non-circular cross-sectional portion formed by cutting out a front end of the retainer portion by machining, the non-circular cross-sectional portion having a non-circular axial cross section engaging the non-circular portion of the spool shaft; and
    a fixation member fixing the retainer member to the spool shaft preventing the retainer member from axially relatively moving.

2. The spinning reel spool support structure according to claim 1, wherein
    the non-circular cross-sectional portion has a cut-out shape that radially extends at the front end of the retainer portion.

3. The spinning reel spool support structure according to claim 2, wherein
    the non-circular cross-sectional portion is formed by milling.

4. The spinning reel spool support structure according to claim 3, wherein
    the non-circular cross-sectional portion has a cut-out shape that includes a pair of parallel-opposed surfaces.

5. The spinning reel spool support structure according to claim 4, wherein
    the bearing section includes a first bearing and a second bearing disposed rearward of the first bearing, and
    the retainer portion includes
        a first retainer portion having the non-circular cross-sectional portion on a front end thereof, the first bearing being disposed on an outer periphery of the first retainer portion, and
        a second retainer portion disposed rearward of the first retainer portion, the second bearing being disposed on an outer periphery of the second retainer portion.

6. The spinning reel spool support structure according to claim 5, further comprising
    a disc portion disposed between the first retainer portion and the second retainer portion, the disc portion including an outer periphery having a diameter greater than diameters of either of the first and second retainer portions.

7. The spinning reel spool support structure according to claim 6, wherein
    the first retainer portion further includes a radial through hole, and
    the fixation member penetrates through the radial through hole.

8. The spinning reel spool support structure according to claim 5, wherein
    the first retainer portion further includes a radial through hole, and
    the fixation member penetrates through the radial through hole.

9. The spinning reel spool support structure according to claim 2, wherein
    the non-circular cross-sectional portion has a cut-out shape that includes a pair of parallel-opposed surfaces.

10. The spinning reel spool support structure according to claim 1, wherein
    the non-circular cross-sectional portion is formed by milling.

11. The spinning reel spool support structure according to claim 10, wherein
    the non-circular cross-sectional portion has a cut-out shape that includes a pair of parallel-opposed surfaces.

12. The spinning reel spool support structure according to claim 11, wherein the bearing section includes a first bearing and a second bearing disposed rearward of the first bearing, and
    the retainer portion includes
        a first retainer portion having the non-circular cross-sectional portion on a front end thereof, the first bearing being disposed on an outer periphery of the first retainer portion, and
        a second retainer portion disposed rearward of the first retainer portion, the second bearing being disposed on an outer periphery of the second retainer portion.

13. The spinning reel spool support structure according to claim 12, further comprising
    a disc portion disposed between the first retainer portion and the second retainer portion, the disc portion including an outer periphery having a diameter greater than diameters of either of the first and second retainer portions.

14. The spinning reel spool support structure according to claim 1, wherein
    the non-circular cross-sectional portion has a cut-out shape that includes a pair of parallel-opposed surfaces.

15. The spinning reel spool support structure according to claim 14, wherein
    the bearing section includes a first bearing and a second bearing disposed rearward of the first bearing, and
    the retainer portion includes
        a first retainer portion having the non-circular cross-sectional portion on a front end thereof, the first bearing being disposed on an outer periphery of the first retainer portion, and
        a second retainer portion disposed rearward of the first retainer portion, the second bearing being disposed on an outer periphery of the second retainer portion.

16. The spinning reel spool support structure according to claim 15, further comprising
a disc portion disposed between the first retainer portion and the second retainer portion, the disc portion including an outer periphery having a diameter greater than diameters of either of the first and second retainer portions.

17. The spinning reel spool support structure according to claim 1, wherein
the bearing section includes a first bearing and a second bearing disposed rearward of the first bearing, and
the retainer portion includes
a first retainer portion having the non-circular cross-sectional portion on a front end thereof, the first bearing being disposed on an outer periphery of the first retainer portion, and
a second retainer portion disposed rearward of the first retainer portion, the second bearing being disposed on an outer periphery of the second retainer portion.

18. The spinning reel spool support structure according to claim 17, further comprising
a disc portion disposed between the first retainer portion and the second retainer portion, the disc portion including an outer periphery having a diameter greater than diameters of either of the first and second retainer portions.

19. The spinning reel spool support structure according to claim 18, wherein
the first retainer portion further includes a radial through hole, and
the fixation member penetrates through the radial through hole.

20. A spinning reel comprising:
a handle;
a rotor;
a reel unit relatively rotatably supporting the handle and the rotor;
a spool disposed at a front of the rotor and being configured to have fishing line wound around an outer periphery of the spool, the spool having a spool shaft moving back and forth relative to the reel unit in response to rotation of the handle, the spool shaft having a non circular portion with a non-circular axial cross section on a front end of the spool shaft; and
a spool support structure axially fixed to the spool, the spinning reel spool support structure having
a bearing section disposed on an inner periphery of the spool, the bearing section supporting the spool to allow the spool to rotate relatively,
a retainer member having
a retainer portion having an outer periphery, the bearing section being disposed on an outer periphery of the retainer portion,
a through hole having a circular axial cross section and an inner periphery, the inner periphery of the through hole being axially penetrated by the non-circular portion of the spool shaft from back to front, and
a non-circular cross-sectional portion formed by cutting out a front end of the retainer portion by machining, the non-circular cross-sectional portion having a non-circular axial cross section engaging the non-circular portion of the spool shaft, and
a fixation member fixing the retainer member to the spool shaft preventing the retainer member from axially relatively moving.

* * * * *